US012774146B2

(12) United States Patent
Asano et al.

(10) Patent No.: US 12,774,146 B2
(45) Date of Patent: Oct. 27, 2026

(54) PACKAGING BAG FOR FILLING CRUSHED POLYSILICON MATERIAL AND POLYSILICON PACKAGE

(71) Applicant: TOKUYAMA CORPORATION, Yamaguchi (JP)

(72) Inventors: Takuya Asano, Yamaguchi (JP); Takuya Yokose, Yamaguchi (JP); Toru Onoda, Yamaguchi (JP)

(73) Assignee: TOKUYAMA CORPORATION, Yamaguchi (JP)

( * ) Notice: Subject to any disclaimer, the term of this patent is extended or adjusted under 35 U.S.C. 154(b) by 277 days.

(21) Appl. No.: 18/279,095

(22) PCT Filed: Mar. 1, 2022

(86) PCT No.: PCT/JP2022/008498
§ 371 (c)(1),
(2) Date: Aug. 28, 2023

(87) PCT Pub. No.: WO2022/190945
PCT Pub. Date: Sep. 15, 2022

(65) Prior Publication Data

US 2024/0010414 A1 Jan. 11, 2024

(30) Foreign Application Priority Data

Mar. 8, 2021 (JP) ................................ 2021-036182

(51) Int. Cl.
*B65D 81/24* (2006.01)
*B32B 27/08* (2006.01)
(Continued)

(52) U.S. Cl.
CPC .............. *B65D 81/24* (2013.01); *B32B 27/08* (2013.01); *B32B 27/32* (2013.01); *B32B 27/34* (2013.01);
(Continued)

(58) Field of Classification Search
CPC ........ B65D 81/24; B65D 65/40; B65D 77/04; B65D 31/02; B32B 27/08; B32B 27/32;
(Continued)

(56) References Cited

U.S. PATENT DOCUMENTS

2017/0233174 A1 8/2017 Yoshimura et al.
2022/0297913 A1 9/2022 Nakajima et al.

FOREIGN PATENT DOCUMENTS

JP 2002-68725 3/2002
JP 2002-274594 9/2002
(Continued)

OTHER PUBLICATIONS

English machine translation for JP2012-101838. (Year: 2012).*
(Continued)

*Primary Examiner* — Michael C Miggins
(74) *Attorney, Agent, or Firm* — Casimir Jones, S.C.; Robert A. Goetz

(57) ABSTRACT

A packaging bag according to the present invention for packing a crushed polysilicon material is a packaging bag (1) for directly packaging a crushed polysilicon material and includes a multi-layer film in which an additive-free polyethylene-based resin layer (2) is disposed in an innermost layer, and, on the polyethylene-based resin layer, at least a gas barrier layer (3) and a reinforcing material layer (4) are stacked.

8 Claims, 1 Drawing Sheet

(51) Int. Cl.

| | |
|---|---|
| ***B32B 27/32*** | (2006.01) |
| ***B32B 27/34*** | (2006.01) |
| ***B32B 27/36*** | (2006.01) |
| ***B65D 65/40*** | (2006.01) |
| ***B65D 77/04*** | (2006.01) |

(52) U.S. Cl.
CPC .............. *B32B 27/36* (2013.01); *B65D 65/40* (2013.01); *B65D 77/04* (2013.01); *B32B 2250/02* (2013.01); *B32B 2250/24* (2013.01); *B32B 2255/10* (2013.01); *B32B 2255/20* (2013.01); *B32B 2307/581* (2013.01); *B32B 2307/7246* (2013.01); *B32B 2439/46* (2013.01); *B65D 2565/387* (2013.01)

(58) Field of Classification Search
CPC ..... B32B 27/34; B32B 27/36; B32B 2250/02; B32B 2250/24; B32B 2255/10; B32B 2255/20; B32B 2307/581; B32B 2307/7246; B32B 2439/46; B32B 2264/1021; C08L 23/06
See application file for complete search history.

(56) References Cited

FOREIGN PATENT DOCUMENTS

| | | | |
|---|---|---|---|
| JP | 2010-195425 | | 9/2010 |
| JP | 2011-094638 | | 5/2011 |
| JP | 2012-101838 | | 5/2012 |
| JP | 2012-223942 | | 11/2012 |
| JP | 2018-122872 | | 8/2018 |
| JP | 2019-6497 | | 1/2019 |
| JP | 2020-015207 | A | 1/2020 |
| WO | 2016/047574 | | 3/2016 |
| WO | 2021/039922 | A1 | 3/2021 |

OTHER PUBLICATIONS

English machine translation for JP2012-223942. (Year: 2012).*
English machine translation for JP2002-274594. (Year: 2002).*
Office Action for CN Patent Application No. 202280016000.3, dated Jul. 8, 2025, 7 pages.
Written Opinion for Application No. PCT/JP2022/008498 and its English translation, dated May 17, 2022, 5 pages.
International Search Report for Application No. PCT/JP2022/008498 and its English translation, dated May 17, 2022, 2 pages.
SEMI PV50-0114 "Specification for High-Purity Polyethylene Packaging Materials for Polysilicon" mailed Jan. 1, 2014, 1 page.
Office Action for CN Patent Application No. 202280016000.3, dated Apr. 13, 2026, 8 pages.
Decision of Refusal for JP Patent Application No. 2023-505315, dated May 26, 2026, 6 pages.

* cited by examiner

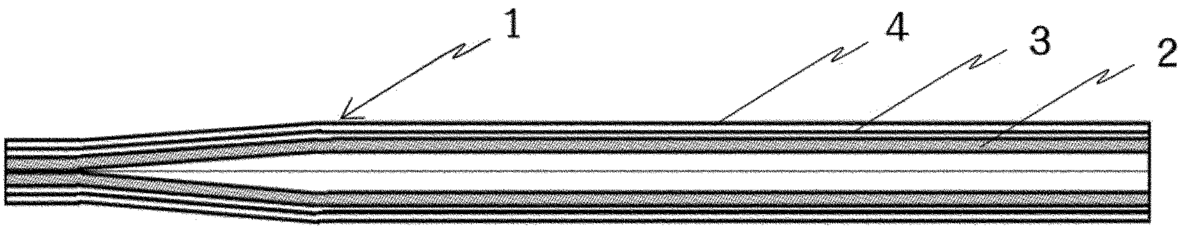
1
4
3
2

PACKAGING BAG FOR FILLING CRUSHED POLYSILICON MATERIAL AND POLYSILICON PACKAGE

STATEMENT OF RELATED APPLICATIONS

This application is a national phase application under 35 U.S.C. § 371 of PCT International Application No.: PCT/JP2022/008498, filed on Mar. 1, 2023, which claims the benefit of Japan Patent Application No. 2021-036182, filed Mar. 1, 2022, the contents of each of which are incorporated by reference herein.

TECHNICAL FIELD

The present invention relates to a novel packaging bag which is for packing a crushed polysilicon material used as, for example, a raw material for manufacture of semiconductors. More specifically, provided is a packaging bag for packing a crushed polysilicon material (crushed polysilicon material packing packaging bag) which makes it possible to more highly prevent, from immediately after packing of the crushed polysilicon material, contamination of the crushed polysilicon material due to ambient air.

BACKGROUND ART

A highly pure polysilicon rod is produced mainly through a Siemens method and is used as a raw material for manufacture of single-crystal silicon used as a material for a semiconductor device and the like. The Siemens method is a method in which electric current is caused to pass through a seed (core wire) of highly pure silicon to heat the seed and, on the surface of the seed, a silane-based gas and hydrogen are reacted with each other, so that a highly pure polysilicon rod is vapor-grown.

The polysilicon produced through the Siemens method has a rod shape. Such polysilicon may be crushed and be packed and packaged in the shape of chunks of a crushed polysilicon material. The crushed polysilicon material may be transported to, for example, a single-crystal polysilicon manufacture factory.

The crushed polysilicon material is subjected to, according to need, an etching process for removing impurities at the surface thereof and then, in order to be prevented from being contaminated, is packed into a packaging bag made of a polyethylene-based resin film so that a package is formed. Typically, this is packaged in a transportation case such as a cardboard box and is transported.

In recent years, regarding contamination of the crushed polysilicon material, an event has been reported in which, after the crushed polysilicon material is packed into the packaging bag and is packaged, a contamination gas penetrates through the polyethylene-based resin film and contaminates the crushed polysilicon material, and a measure to address such an event has been proposed. Examples of such contamination gases include water vapor contained in ambient air, a volatile organic matter (for example, Diethyl phthalate (DEP), Dibutyl phthalate (DBP) and the like, which are organic components derived from an environment), and a metal-containing vapor.

For example, a measure to prevent contamination of polysilicon has been taken by employing an arrangement in which: the crushed polysilicon material is packaged in a double bag constituted by an inner bag made of a polyethylene-based resin and an outer bag; and a packaging bag constituting the outer bag is provided with gas barrier properties (see Patent Literature 1).

All of conventionally proposed measures for preventing the contamination are to provide gas barrier properties to an outer bag, as described above. In contrast, a packaging bag constituting an inner bag directly contacting the crushed polysilicon material has been, in the existing techniques, constituted by only a layer made of an additive-free polyethylene-based resin film in order to prevent contamination of the crushed polysilicon material.

However, the present inventors confirmed the following: the contamination due to penetration of the contamination gas through the packaging bag starts immediately after the crushed polysilicon material has been packed into the packaging bag. Such a conventional measure of providing gas barrier properties to the outer bag may cause the contamination due to the penetration of the contamination gas even during a period after packing of the polysilicon into the packaging bag until insertion of the packaging bag into the outer bag. Therefore, it was found that providing gas barrier properties to the outer bag could not sufficiently prevent such contamination.

Further, when the crushed polysilicon material is loaded for single crystal pulling with use of the crushed polysilicon material, the crushed polysilicon material is brought into a clean room typically in a state where the outer bag is taken off. Such a state has caused a problem in that since the inner bag has no gas barrier properties, the crushed polysilicon material is contaminated before the single crystal pulling.

CITATION LIST

Patent Literature

Patent Literature 1

Japanese Patent Application Publication Tokukai No. 2010-195425

SUMMARY OF INVENTION

Technical Problem

Thus, an object of an aspect of the present invention is to provide a crushed polysilicon material packing packaging bag which makes it possible to, in packaging of a crushed polysilicon material, more highly prevent contamination of the crushed polysilicon material due to ambient air during a period immediately after the packaging until use of the crushed polysilicon material.

Solution to Problem

The present inventors repeatedly carried out a diligent study in order to attain the foregoing object. It has been conventional common knowledge that a packaging bag for directly packaging a crushed polysilicon material is constituted by only a layer made of an additive-free polyethylene-based resin film in order to prevent contamination of the crushed polysilicon material. However, the present inventors has defied such common knowledge and has found constituting a packaging bag by a laminate having a specific layer structure which includes, as an innermost layer, a layer made of the additive-free polyethylene-based resin. In addition, the present inventors found the following: such a packaging bag makes it possible to effectively prevent, during a period immediately after packing of the crushed polysilicon material into the packaging bag until immediately before use of the crushed polysilicon material, contamination due to penetration of a contamination gas caused by contact with ambient air. As a result, the present inventors have achieved the present invention.

That is, a crushed polysilicon packing packaging bag in accordance with an aspect of the present invention is a packaging bag for directly packing crushed polysilicon, the crushed polysilicon packing packaging bag including a multi-layer film in which an additive-free polyethylene-based resin layer is disposed in an innermost layer, and, on the polyethylene-based resin layer, at least a gas barrier layer and a reinforcing material layer are stacked.

Advantageous Effects of Invention

The crushed polysilicon material packing packaging bag in accordance with an aspect of the present invention includes an additive-free polyethylene-based resin layer in an innermost layer, and thus makes it possible to prevent contamination due to contact between the crushed polysilicon material packed and the packaging bag. Furthermore, the crushed polysilicon material packing packaging bag includes a gas barrier layer and thus makes it possible to effectively prevent, during a period immediately after packing of the crushed polysilicon material into the packaging bag until immediately before use of the crushed polysilicon material, contamination of the crushed polysilicon material due to penetration of a contamination gas caused by contact with ambient air.

BRIEF DESCRIPTION OF DRAWINGS

FIG. 1 is a view schematically illustrating a cross-section of a representative aspect of a crushed polysilicon material packing packaging bag in accordance with an embodiment of the present invention.

DESCRIPTION OF EMBODIMENTS

FIG. 1 illustrates a state of a cross section of a representative aspect of a crushed polysilicon material packing packaging bag 1 in accordance with an embodiment of the present invention. With reference to FIG. 1, the crushed polysilicon material packing packaging bag 1 is a packaging bag for directly packaging a crushed polysilicon material. The crushed polysilicon material packing packaging bag 1 includes a multi-layer film in which an additive-free polyethylene-based resin layer 2 is disposed in an innermost layer, and, on the polyethylene-based resin layer 2, at least a gas barrier layer 3 and a reinforcing material layer 4 are stacked. The crushed polysilicon material is obtained by mechanically crushing a polysilicon rod produced through, for example, a Siemens method.

The additive-free polyethylene-based resin of which the additive-free polyethylene-based resin layer 2 constituting the crushed polysilicon material packing packaging bag 1 in accordance with an embodiment of the present invention is made is a polyethylene-based resin to which an additive that contaminates the crushed polysilicon material is not added. As the additive-free polyethylene-based resin, a known additive-free polyethylene-based resin which has been conventionally used for packaging of a crushed polysilicon material is used without particular limitation. Examples of such a polyethylene-based resin include low-density polyethylene (LDPE), high-density polyethylene (HDPE), linear low-density polyethylene (LLDPE), and LLDPE in which a catalyst such as metallocene is used (hereinafter, also referred to as metallocene LLDPE). Among the above examples, LLDPE or metallocene LLDPE is suitably used since they have excellent piercing resistances, in a case where layers are formed.

The additive-free polyethylene-based resin layer 2 needs to be disposed in an innermost layer in order to prevent contamination due to contact between an inner surface of a package and the crushed polysilicon material packed.

It is desired that a level of metal contamination at a surface of the additive-free polyethylene-based resin layer 2 is as low as possible. It is preferable that metal concentrations at the surface analyzed through extraction of metals with use of hydrofluoric acid are: not more than 15 $pg/cm^2$ for Fe; not more than 5 $pg/cm^2$ for Cr; not more than 5 $pg/cm^2$ for Ni; not more than 5 $pg/cm^2$ for Cu; not more than 10 $pg/cm^2$ for Zn; not more than 50 $pg/cm^2$ for Al; and not more than 20 $pg/cm^2$ for Ca.

The additive-free polyethylene-based resin layer 2 has a thickness which is not particularly limited but, in consideration of, for example, wear due to contact with the crushed polysilicon material, preferably has a thickness of not less than 20 μm, particularly, not less than 30 μm. In addition, the thickness of the additive-free polyethylene-based resin layer 2 has an upper limit of preferably not more than 200 μm, particularly, not more than 100 μm in view of decrease in flexibility due to lamination with another layer.

The gas barrier layer 3 constituting the crushed polysilicon material packing packaging bag 1 in accordance with an embodiment of the present invention is disposed in a layer outside the additive-free polyethylene-based resin layer 2. The gas barrier layer 3 prevents a contamination gas that penetrates through the crushed polysilicon material packing packaging bag 1 from entering the bag and has an effect of preventing contamination of the crushed polysilicon material from immediately after the packaging. In addition, the gas barrier layer 3 has an effect of preventing also water vapor that penetrates through the crushed polysilicon material packing packaging bag 1 from entering the bag. Typically, as a water vapor transmission rate is lower, a transmission rate of an organic matter becomes lower. Thus, at a lower water vapor transmission rate, a greater effect of preventing the contamination of the crushed polysilicon material is exerted.

As a material of the gas barrier layer 3, a known material that has an excellent function of preventing the above penetration of the contamination gas is used without particular limitation. Examples of such a material include an inorganic matter, such as silicon oxide and metal aluminum, and a resin, such as polyvinyl alcohol. Typically, the inorganic matter forms a gas barrier layer as a vapor-deposited film, and the resin forms a gas barrier layer as a laminate film.

Among the above materials of the gas barrier layer 3, as the inorganic matter, use of silicon oxide is particularly preferable in order to prevent metal contamination of the crushed polysilicon material packaged. That is, the gas barrier layer 3 is particularly preferably a vapor-deposited film of silicon oxide.

An optimal thickness of the gas barrier layer 3 is determined as appropriate in consideration of the material of the gas barrier layer 3. Specifically, in the multi-layer film constituting the crushed polysilicon material packing packaging bag 1, the thickness of the gas barrier layer 3 may be determined so that a water vapor transmission rate of the gas barrier layer 3 can be not more than 1.2 $g/m^2 \cdot day$, preferably not more than 0.7 $g/m^2 \cdot day$, more preferably not more than 0.5 g/m$^2$·day. In order to achieve the above performance, in the case of the vapor-deposited film of the inorganic matter, the thickness of the gas barrier layer 3 is not less than 30 nm, preferably not less than 50 nm, and in the case of the resin, the thickness of the gas barrier layer 3 is not less than 0.01 μm, preferably not less than 0.1 μm.

In addition, when the gas barrier layer 3 is excessively thick, the flexibility of the crushed polysilicon material packing packaging bag 1 is reduced. Thus, in the case of the vapor-deposited film of the inorganic matter, the thickness of the gas barrier layer 3 is preferably not more than 150 nm, and in the case of the resin, the thickness of the gas barrier layer 3 is preferably not more than 50 μm.

The reinforcing material layer 4 constituting the crushed polysilicon material packing packaging bag 1 in accordance with an embodiment of the present invention is disposed in a layer outside the additive-free polyethylene-based resin layer 2. The reinforcing material layer 4 is for preventing the gas barrier layer from breaking due to stretch of the crushed polysilicon material packing packaging bag 1 caused by packing the crushed polysilicon material. The reinforcing material layer 4 makes it possible to provide a stable performance of preventing contamination to the crushed polysilicon material packing packaging bag 1.

The reinforcing material layer 4 may be made of any material and may have any structure, provided that the reinforcing material layer 4 can provide a stress enough for the multi-layer film constituting the crushed polysilicon material packing packaging bag 1 to barely stretch during, for example, packing of the crushed polysilicon material. Specifically, a known reinforcing film that can provide the multi-layer film, which constitutes the crushed polysilicon material packing packaging bag 1, with a piercing strength of not less than 10 N, preferably not less than 12 N measured in conformity to JIS-Z1707 is used without particular limitation. The piercing strength of the multi-layer film falling within the above range makes it possible to prevent contamination due to contact of the polysilicon with ambient air caused when the packaging bag is burst through by a sharp corner of the crushed polysilicon material in the crushed polysilicon material packing packaging bag 1 during transportation of the crushed polysilicon material packing packaging bag 1.

Note that it is also possible to arrange such that the additive-free polyethylene-based resin layer 2 is thickened so as to have a function of a reinforcing material and accordingly, the packaging bag is provided with the above characteristic. This however may reduce the flexibility of the packaging bag.

Specific examples of the reinforcing material layer 4 include a configuration of, for example, a film or a perforated film which are each made of a material, such as: polyethylene terephthalate (PET); and polyamide-based resin, such as nylon, having an aliphatic skeleton, or a nonwoven fabric made of the above material. In order to improve the piercing strength of the multi-layer film constituting the crushed polysilicon material packing packaging bag 1, the reinforcing material layer 4 preferably contains a polyamide-based resin having an aliphatic skeleton and more preferably contains PET and the polyamide-based resin having an aliphatic skeleton.

Examples of the polyamide-based resin having an aliphatic skeleton include, for example, a condensation polymer, such as nylon 6, nylon 11, nylon 12, nylon 46, nylon 66, nylon 69, nylon 610, and nylon 612, or a copolymer of two or more of these. Among these, the nylon 6 and/or the nylon 66 is preferable.

In order to improve the piercing strength of the multi-layer film constituting the crushed polysilicon material packing packaging bag 1, the amount of a polyamide-based resin which has an aliphatic skeleton and which is contained in the reinforcing material layer 4 is, relative to 100% by mass of materials constituting the reinforcing material layer 4, preferably not less than 50% by mass and more preferably not less than 60% by mass. Further, the amount of the polyamide-based resin having an aliphatic skeleton is preferably not more than 90% by mass and more preferably not more than 80% by mass in view of decrease in flexibility.

In the crushed polysilicon material packing packaging bag 1 in accordance with an embodiment of the present invention, in a case where a base material layer is required to form the gas barrier layer, like the case where the gas barrier layer is formed through vapor deposition, the reinforcing material layer 4 can be used also as a base material layer.

In addition, the thickness of the reinforcing material layer 4 has a lower limit of preferably not less than 10 μm and more preferably not less than 20 μm in view of the piercing strength. The thickness of the reinforcing material layer 4 has an upper limit of preferably not more than 50 μm and more preferably not more than 40 μm in view of flexibility.

In the crushed polysilicon material packing packaging bag 1 in accordance with an embodiment of the present invention, in view of handleability of the packaging bag and easiness of fusing of an opening, it is preferable that the multi-layer film has a total thickness of not more than 300 μm, preferably not more than 200 μm.

In the multi-layer film of the crushed polysilicon material packing packaging bag 1 in accordance with an embodiment of the present invention, provided that the polyethylene-based resin layer 2 is an innermost layer, the other layers can be stacked in any order. For example, the gas barrier layer 3 and the reinforcing material layer 4 may be stacked in this order on the polyethylene-based resin layer 2, as illustrated in FIG. 1, or the reinforcing material layer 4 and the gas barrier layer 3 may be stacked in this order on the polyethylene-based resin layer 2. Among these, an aspect in which the gas barrier layer 3 is an intermediate layer, and a layer outside the gas barrier layer 3 is a reinforcing material layer (that is, the reinforcing material layer 4 is disposed in an outermost layer) is preferable since such an aspect can effectively prevent breakage of the gas barrier layer.

In particular, an aspect in which, on an innermost polyethylene-based resin layer, a reinforcing material layer, a gas barrier layer, and a reinforcing layer are stacked in this order is preferable since such an aspect can further improve strength of the packaging bag and further improve the effect of preventing breakage of the gas barrier layer.

Further, it is possible to stack another functional material layer which has no impact on an embodiment of the present invention. Furthermore, an aspect of joining between respective layers to constitute the multi-layer film is determined as appropriate depending on the materials of the layers. Examples of such joining include fusing and bonding.

In an embodiment of the present invention, as a shape of the crushed polysilicon material packing packaging bag 1, a known shape is employed without particular limitation. For example, a flat bag as illustrated in FIG. 1 or a gazette bag is typically employed.

An embodiment of the present invention encompasses a polysilicon package including the crushed polysilicon material packing packaging bag 1 into which the crushed polysilicon material has been packed.

In an embodiment the present invention, the crushed polysilicon material to be packed into the crushed polysilicon material packing packaging bag 1 has a known size, which is not particularly limited. The crushed polysilicon material packing packaging bag 1 is suitable for a crushed polysilicon material having an average longitudinal diameter (average maximum piece length) of 5 mm to 150 mm, particularly 30 mm to 110 mm.

Further, a size of the crushed polysilicon material packing packaging bag 1 is typically for packing polysilicon having a weight of 5 kg or 10 kg.

The crushed polysilicon material packing packaging bag 1 in accordance with an embodiment of the present invention can be shipped as it is, after the crushed polysilicon material is packed. Alternatively, the crushed polysilicon material packing packaging bag 1 can be used as an inner bag and enclosed in an outer bag. That is, an embodiment of the present invention encompasses a double-packaging polysilicon package including a polysilicon package enclosed in an outer bag. As such an outer bag, a bag made of a known material and having a known shape can be used as appropriate. Typically, a flat bag or gazette bag made of a polyethylene-based resin film is preferably used as the outer bag.

Aspects of the present invention can also be expressed as follows:

A crushed polysilicon material packing packaging bag in accordance with an aspect of the present invention is a packaging bag for directly packing crushed polysilicon material, the crushed polysilicon material packing packaging bag including a multi-layer film in which an additive-free polyethylene-based resin layer is disposed in an innermost layer, and, on the polyethylene-based resin layer, at least a gas barrier layer and a reinforcing material layer are stacked.

In the crushed polysilicon material packing packaging bag, the gas barrier layer may be a vapor-deposited film of silicon oxide.

In the crushed polysilicon material packing packaging bag, the reinforcing material layer may be a resin layer containing a polyamide-based resin having an aliphatic skeleton.

In the crushed polysilicon material packing packaging bag, the reinforcing material layer may be disposed in an outermost layer in the multi-layer film.

In the crushed polysilicon material packing packaging bag, the multi-layer film may have a piercing strength of not less than 10 N measured in conformity to JIS-Z1707.

A polysilicon package in accordance with an aspect of the present invention includes the crushed polysilicon material packing packaging bag into which crushed polysilicon material has been packed.

In the polysilicon package in accordance with an aspect of the present invention, the crushed polysilicon material filled may have an average maximum piece length of 5 mm to 150 mm.

A polysilicon double package in accordance with an aspect of the present invention includes the polysilicon package enclosed in an outer bag made of a polyethylene-based resin film.

EXAMPLES

The following will show Examples in order to describe an embodiment of the present invention in more detail, but an embodiment of the present invention is not limited to Examples.

Note that in Examples, measurements were performed by the following methods.

(1) Method for Measuring Impurity Concentration at Surface of Crushed Polysilicon Material Into a clean polytetrafluoroethylene beaker having a capacity of 500 ml, 40 g of crushed polysilicon chunks were transferred. Then, 100 ml of a solution (50% by mass—HF: 10 ml and 70% by mass–nitric acid: 90 ml) was added, and extraction was performed at 25° C. for 15 minutes. Liquid contents in the polytetrafluoroethylene beaker and cleaning water that was obtained by cleaning surfaces of the crushed polysilicon chunks with use of 100 ml of ultrapure water were transferred into a clean polytetrafluoroethylene beaker, and were regarded as an extraction solution from surfaces (surface extraction solution) of the crushed polysilicon chunks. The surface extraction solution of the crushed polysilicon chunks was evaporated to dryness, and a 3.5% by mass—nitric acid aqueous solution was added to the surface extraction solution evaporated, so that a volume was adjusted to 20.0 ml. ICP-MS measurement was then performed to calculate each metal concentration at the surfaces as a value of a concentration per total weight of the crushed polysilicon chunks.

Example 1

A multi-layer film used was obtained by stacking, in the following order, (i) an additive-free polyethylene-based resin layer 2 having a thickness of 30 μm, (ii) a polyethylene terephthalate film on which a vapor-deposited film of silicon oxide having a thickness of 0.05 μm was formed as a gas barrier layer 3 (a total thickness of 12 μm; a film in which a gas barrier layer was disposed on an outer side and the polyethylene terephthalate film served as a part of a reinforcing material layer), and (iii) a reinforcing material layer 4 which was made of polyethylene terephthalate and which had a thickness of 20 μm. The multi-layer film was heat-sealed such that the additive-free polyethylene-based an resin layer 2 was innermost layer. As a result, obtained was a crushed polysilicon material packing packaging bag having a shape of a flat bag with a size of 30 cm×60 cm. Note that the multi-layer film constituting the crushed polysilicon material packing packaging bag had a piercing strength of 25 N and had a water vapor transmission rate of 0.4 $g/m^2$·day. In addition, regarding metal concentrations that were analyzed through extraction with use of hydrofluoric acid and that were each concentration at an inner surface of the crushed polysilicon material packing packaging bag, the metal concentrations were: 5 $pg/cm^2$ for Fe; 1 $pg/cm^2$ for Cr; 1 $pg/cm^2$ for Ni; 1 $pg/cm^2$ for Cu; 5 $pg/cm^2$ for Zn; 25 $pg/cm^2$ for Al; and 10 $pg/cm^2$ for Ca.

Through a hopper, 5 kg of the crushed polysilicon material which had an average major axis of 45 mm and which had been subjected to an etching process was packed into the crushed polysilicon material packing packaging bag in a clean room maintained at a class 4 cleanliness level. After the packing, an opening was immediately heat-sealed to be hermetically sealed, so that a polysilicon package was obtained. The number of the polysilicon packages produced was 50. The polysilicon packages were left to stand inside the clean room for 5 hours and were left to stand outside the clean room for 12 hours. Then, immediately after the polysilicon packages were brought into the clean room, the polysilicon packages were opened. From each of the polysilicon packages, 5 chunks of the crushed polysilicon material were randomly taken out. Impurity concentrations at the surfaces of the crushed polysilicon material taken out were then measured. As a result, average concentrations of impure elements were: 10 pptw for Fe; 1 pptw for Cr; 1 pptw for Ni; 1 pptw for Cu; 5 pptw for Zn; 5 pptw for Al; and 10 pptw for Ca. Further, as a result of measurement using gas chromatography for organic components derived from an environment, neither a peak of DEP nor a peak of DBP was detected.

Note that, in Examples and Comparative Examples, quantitative determination of the organic components derived from the environment was performed by calculation from a peak area ratio with use of 100 ng standard samples of DEP, DBP, and Bis(2-ethylhexyl)phthalate (DOP).

Comparative Example 1

Except that the gas barrier layer was not provided, and accordingly, in the thickness of the multi-layer film, the thickness of the additive-free polyethylene-based resin layer was set to 50 μm, as in Example 1, a crushed polysilicon material was packed into a crushed polysilicon material packing packaging bag, and polysilicon packages were produced. The multi-layer film constituting the crushed polysilicon material packing packaging bag had a piercing strength of 14 N and had a water vapor transmission rate of 1.3 $g/m^2$·day.

The resulting polysilicon packages were left to stand inside the clean room for 5 hours and were left to stand outside the clean room for 12 hours. The polysilicon packages were then brought into the clean room and, immediately after that, were opened. From each of the polysilicon packages, 5 chunks of the crushed polysilicon material were randomly taken out. Impurity concentrations at the surfaces of the crushed polysilicon material taken out were then measured. As a result, average concentrations of impure elements were: 20 pptw for Fe; 5 pptw for Cr; 5 pptw for Ni; 1 pptw for Cu; 10 pptw for Zn; 10 pptw for Al; and 50 pptw for Ca. Further, as a result of measurement of organic components derived from an environment as in Examples, peaks of DEP and DBP were detected. As a result of quantitative determination, DEP was 60 pptw, and DBP was 100 pptw.

Example 2

Except that the reinforcing material layer 4 was changed to a reinforcing material layer 4 which was made of polyethylene terephthalate and nylon 6 and which had a thickness of 20 μm, as in Example 1, a crushed polysilicon material was packed, and polysilicon packages were produced. In the reinforcing material layer 4, a mass ratio (polyethylene terephthalate:nylon) of the polyethylene terephthalate and the nylon was 1:1.5. The multi-layer film constituting the crushed polysilicon material packing packaging bag had a piercing strength of 30 N and had a water vapor transmission rate of 0.4 $g/m^2$·day.

The resulting polysilicon packages were left to stand inside the clean room for 5 hours and were left to stand outside the clean room for 12 hours. The polysilicon packages were then brought into the clean room and, immediately after that, were opened. From each of the polysilicon packages, 5 chunks of the crushed polysilicon material were randomly taken out. Impurity concentrations at the surfaces of the crushed polysilicon material taken out were then measured. As a result, average concentrations of impurity elements were: 12 pptw for Fe; 2 pptw for Cr; 1 pptw for Ni; 0 pptw for Cu; 4 pptw for Zn; 5 pptw for Al; and 15 pptw for Ca. Further, as a result of measurement using gas chromatography for organic components derived from an environment, neither a peak of DEP nor a peak of DBP was detected.

Example 3

A crushed polysilicon material was packed as in Example 1, and double-packaging polysilicon packages were then produced with use of outer bags made of polyethylene. The multi-layer film constituting the crushed polysilicon material packing packaging bag had a piercing strength of 20 N and had a water vapor transmission rate of 0.4 $g/m^2$·day.

The resulting double-packaging polysilicon packages were left to stand inside the clean room for 5 hours and were left to stand outside the clean room for 12 hours. The outer bags were then opened, and only the polysilicon packages were brought into the clean room. Immediately after that, the polysilicon packages were opened. From each of the polysilicon packages, 5 chunks of the crushed polysilicon material were randomly taken out. Impurity concentrations at the surfaces of the crushed polysilicon material taken out were then measured. As a result, average concentrations of impure elements were: 20 pptw for Fe; 5 pptw for Cr; 5 pptw for Ni; 1 pptw for Cu; 10 pptw for Zn; 10 pptw for Al; and 50 pptw for Ca. Further, as a result of measurement of organic components derived from an environment as in Examples, peaks of DEP and DBP were detected. As a result of quantitative determination, DEP was 60 pptw, and DBP was 100 pptw.

Note that, in Examples and Comparative Examples, quantitative determination of the organic components derived from the environment was performed by calculation from a peak area ratio with use of 100 ng standard samples of DEP, DBP, and DOP.

Comparative Example 2

A crushed polysilicon material was packed as in Example 1, except that the gas barrier layer was not disposed, and accordingly, in the thickness of the multi-layer film, the thickness of the additive-free polyethylene-based resin layer was 50 μm. Double-packaging polysilicon packages were then produced with use of outer bags including the same gas barrier layer as the one in Example 1. The multi-layer film constituting the crushed polysilicon material packing packaging bag had a piercing strength of 20 N and had a water vapor transmission rate of 0.4 $g/m^2$·day.

The resulting double-packaging polysilicon packages were left to stand inside the clean room for 5 hours and were left to stand outside the clean room for 12 hours. The outer bags were then opened, and only the polysilicon packages were brought into the clean room. Immediately after that, the polysilicon packages were opened. From each of the polysilicon packages, 5 chunks of the crushed polysilicon material were randomly taken out. Impurity concentrations at the surfaces of the crushed polysilicon material taken out were then measured. As a result, average concentrations of impure elements were: 20 pptw for Fe; 5 pptw for Cr; 5 pptw for Ni; 1 pptw for Cu; 10 pptw for Zn; 10 pptw for Al; and 50 pptw for Ca. Further, as a result of measurement of organic components derived from an environment as in Examples, peaks of DEP and DBP were detected. As a result of quantitative determination, DEP was 50 pptw, and DBP was 50 pptw.

In none of polysilicon packages in Examples 1 to 3 and Comparative Example 1, caprolactam was detected at the surfaces of crushed polysilicon material. The measurement of the caprolactam was performed with use of gas chromatography.

Table 1 shows evaluation results of the polysilicon packages of Examples 1 and 2 and Comparative Example 1.

TABLE 1

| | | Example 1 | Example 2 | Comparative Example 1 |
|---|---|---|---|---|
| multi-layer film | Polyethylene-based resin layer 2 | Additive-free PE 30 μm | Additive-free PE 30 μm | Additive-free PE 50 μm |
| | Gas barrier layer 3 | Silicon oxide vapor-deposited film | Silicon oxide vapor-deposited film | Not provided |
| | Reinforcing material layer 4 | PET | PET & Nylon | PET |
| Piercing strength (N) | | 25 | 30 | 14 |
| Water vapor transmission rate ($g/m^2 \cdot day$) | | 0.4 | 0.4 | 1.3 |
| Metal concentration at surface of crushed polysilicon material (pptw) | Fe | 10 | 12 | 20 |
| | Cr | 1 | 2 | 5 |
| | Ni | 1 | 1 | 5 |
| | Cu | 1 | 0 | 1 |
| | Zn | 5 | 4 | 10 |
| | Al | 5 | 5 | 10 |
| | Ca | 10 | 15 | 50 |
| Concentration at surface of crushed polysilicon material (pptw) | DEP DBP | Not detected | Not detected | DEP: 60 DBP: 100 |
| | caprolactam | Not detected | Not detected | Not detected |

REFERENCE SIGNS LIST

1 Crushed polysilicon material packing packaging bag
2 Polyethylene-based resin layer
3 Gas barrier layer
4 Reinforcing material layer

The invention claimed is:

1. A crushed polysilicon material packing packaging bag, which is a packaging bag for directly packaging a crushed polysilicon material, the crushed polysilicon material packing packaging bag comprising:

a multi-layer film in which an additive-free polyethylene-based resin layer is disposed in an innermost layer, and, on the polyethylene-based resin layer, at least a gas barrier layer and a reinforcing material layer are stacked, wherein metal concentrations at a surface of the additive-free polyethylene-based resin layer which are analyzed through extraction of metals with use of hydrofluoric acid are: not more than 15 $pg/cm^2$ for Fe; not more than 5 $pg/cm^2$ for Cr; not more than 5 $pg/cm^2$ for Ni; not more than 5 $pg/cm^2$ for Cu; not more than 10 $pg/cm^2$ for Zn; not more than 50 $pg/cm^2$ for Al; and not more than 20 $pg/cm^2$ for Ca.

2. The crushed polysilicon material packing packaging bag according to claim 1, wherein the reinforcing material layer is a resin layer containing a polyamide-based resin having an aliphatic skeleton.

3. The crushed polysilicon material packing packaging bag according to claim 1, wherein the multi-layer film has a piercing strength of not less than 10 N measured in conformity to JIS-Z1707.

4. The crushed polysilicon material packing packaging bag according to claim 1, wherein the gas barrier layer is a vapor-deposited film of silicon oxide.

5. The crushed polysilicon material packing packaging bag according to claim 1, wherein the reinforcing material layer is disposed in an outermost layer in the multi-layer film.

6. A polysilicon package comprising the crushed polysilicon material packing packaging bag according to claim 1 into which the crushed polysilicon material has been packed.

7. The polysilicon package according to claim 6, wherein the crushed polysilicon material packed has an average maximum piece length of 5 mm to 150 mm.

8. A double-packaging polysilicon package comprising the polysilicon package according to claim 6 enclosed in an outer bag made of a polyethylene-based resin film.

* * * * *